United States Patent [19]

Hellwarth

[11] 4,145,671

[45] Mar. 20, 1979

[54] TIME-REVERSED REPLICATION OF A WAVE FRONT

[75] Inventor: Robert W. Hellwarth, Los Angeles, Calif.

[73] Assignee: University of Southern California, Los Angeles, Calif.

[21] Appl. No.: 867,637

[22] Filed: Jan. 6, 1978

[51] Int. Cl.² .............................................. H01S 3/30
[52] U.S. Cl. .................................. 332/7.51; 307/88.3
[58] Field of Search ..................... 330/4.3; 332/7.51; 307/88.3; 350/160 R; 356/5

[56] References Cited

U.S. PATENT DOCUMENTS

| 3,875,422 | 4/1975 | Stolen | 307/88.3 |
| 4,005,935 | 2/1977 | Wang | 332/7.51 |

OTHER PUBLICATIONS

Hellworth, "Generator of Time Reversed Wave Fronts by Nonlinear Refraction", 1/77, pp. 1–3, J. Opt. Soc. Am., vol. 67, #1, G–250.
Yario, "On Transmission and Recovery of 3-D Image...", 4/76, pp. 301–305, J. Opt. Soc. Am. vol. 66, #4, G–250.
Zel'Dovich et al. "Observation of Wave Front Inversion...", 1/5/77, Pis'ma Zh. Eksp. Teor. Fig. 25, #1, pp. 41–44.
Nosach et al., "Cancellation of Phase Distortions...", 12/5/72, pp. 617–621, Zhetf Pis. Red., 16, #11.

*Primary Examiner*—Nelson Moskowitz
*Attorney, Agent, or Firm*—Nilsson, Robbins, Dalgarn, Berliner, Carson & Wurst

[57] ABSTRACT

An apparatus and method for creating a time-reversed replication of an optical wave front. More specifically, an apparatus and method is disclosed in which a non-linear medium having counter-propagating monochromatic optical waves passing therethrough generates a time-reversed replica of an incident wave, the generation being due to non-linear refraction within the medium. As a monochromatic light-ray beam source irradiates an inhomogeneous, nonabsorbing medium, (e.g., a frosted pane of glass), the wave front of the source beam is broken up during transmission therethrough so that any image information contained within the source beam is unrecognizable from the other side of the frosted glass. According to the present invention, this unrecognizable image, when directed into the non-linear medium containing the counter-propagating optical waves is reflected back as a time-reversed wave due to the non-linear refraction of the medium. When this reflected wave irradiates the same inhomogeneous medium, the source beam is recreated on the source beam side of the frosted glass. A beam splitter then isolates the reconstructed reflected wave from the source wave.

21 Claims, 2 Drawing Figures

TIME-REVERSED REPLICATION OF A WAVE FRONT

FIELD OF THE INVENTION

This invention relates to an apparatus and method for creating a time-reversed replica of an incident wave front.

BACKGROUND AND SUMMARY OF THE INVENTION

For any electromagnetic wave propogating through a light-scattering medium having no permanent magnetism, there can exist in principle a time-reversed replication of that wave. Thus an appropriately patterned but irregular wave front can travel through an inhomogeneous or light-scattering medium and emerge as a coherent uniform wave front, provided it is a replica, reversed in time, of a coherent beam that was originally deformed by the same homogeneous medium.

It is well known that time-reversed waves can be generated by non-linear effects in an irradiated medium. A nearly time-reversed wave of a ruby laser beam whose phase front has been deformed by an inhomogeneous medium has been produced by stimulated Brillouin scattering in the backward direction. However, time reversed waves produced by Brillouin scattering have been found to be downshifted slightly in frequency. Stimulated Brillouin scattering has also been utilized to restore coherency of a laser beam amplified by an inhomogeneous amplifying medium. It is theorized that distortion of images transmitted in multimode optical fibers will be reduced with time-reversed wave fronts generated by parametric mixing in an acentric crystal. This mixing process should produce a time-reversed wave front which, when redirected through the multimode optical fibers, will restore a close facsimile of the originally transmitted wave. However, limitations will be placed on the beam-acceptance angles in this process due to phase matching requirements on waves which can mix efficiently in the acentric crystal. The present invention eliminates both frequency shift and phase matching requirements associated with prior time-reversed wave generation techniques, and a more accurate time-reverse replication is obtained that with either stimulated Brillouin scattering or parametric mixing. In addition, the apparatus disclosed herein allows time-reversed wave fronts to be generated with less input power than was heretofore possible.

According to the present invention, a method and apparatus is provided which will generate a time-reversed replica of an image-bearing wave by superimposing the image bearing wave on two counter-propagating waves present in a transparent medium, the counter-propagating waves being at substantially the same frequency. The apparatus consists of a substantially monochromatic light source irradiating a medium having inhomogeneities in its refractive index, an example of such a medium being glass treated with hydrofluoric acid. The source or incident light passing through the inhomogeneous medium is directed to the time-reversed wave-front generation device of the present invention. This device consists of a homogeneous, transparent, non-linear medium, such as liquid carbon disulfide, which has counter-propagating light passing therethrough, the light being generated by a laser having a substantially monochromatic output. The source light when striking the non-linear medium containing the counter-propagating waves is partially reflected back along the path of the incoming source light, the reflected light being time-reversed with respect to the source light. This time-reversed reflected wave upon striking the inhomogeneous medium is reformed into light having wave front characteristics the same as the originally transmitted source light. This light is then isolated by a beam splitter which reflects a portion of the reconstructed light wave to a viewing means such as a camera. The time-reversed replication of the incident optical wave is induced by a process of non-linear refraction caused by an interaction of the incident optical wave with the counter-propagating pump laser waves within the non-linear medium. Applications of the device can be found in spectroscopy, microscopy, the correction of beam distortions within optical fibers, and correction of beam distortions caused by transmission through an inhomogeneous or light-scattering medium.

DETAILED DESCRIPTION

As required, a detailed illustrative embodiment of the invention is disclosed herein. This embodiment exemplifies the invention and is currently considered to be the best embodiment for that purpose. However, it is to be recognized that various non-linear mediums and techniques for counter-propagating a laser beam through a non-linear medium to implement the principles of the invention can be utilized. Accordingly, the specific apparatus disclosed is representative in providing a basis for the claims which define the scope of the present invention.

As above discussed, the invention provides an optical image replication apparatus in which a time-reversed replica of a wave front is generated by non-linear refraction. The replication is generated when an image-bearing wave is superimposed on two counter-propagating waves, at or near the same frequency, in a transparent non-linear medium. A substantially monochromatic source or incident light beam passing through a phase distorting medium creates an irregular wave front. When this irregular wave front intersects a homogeneous, transparent, non-linear medium having counter-propagating, substantially monochromatic, light waves passing therethrough, it is reflected as a time-reversed wave through non-linear refraction within the medium. When the reflected wave irradiates the phase-distorting medium, it emerges as an ordered wave front having characteristics substantially identical to that of the incident light.

Figure 1:
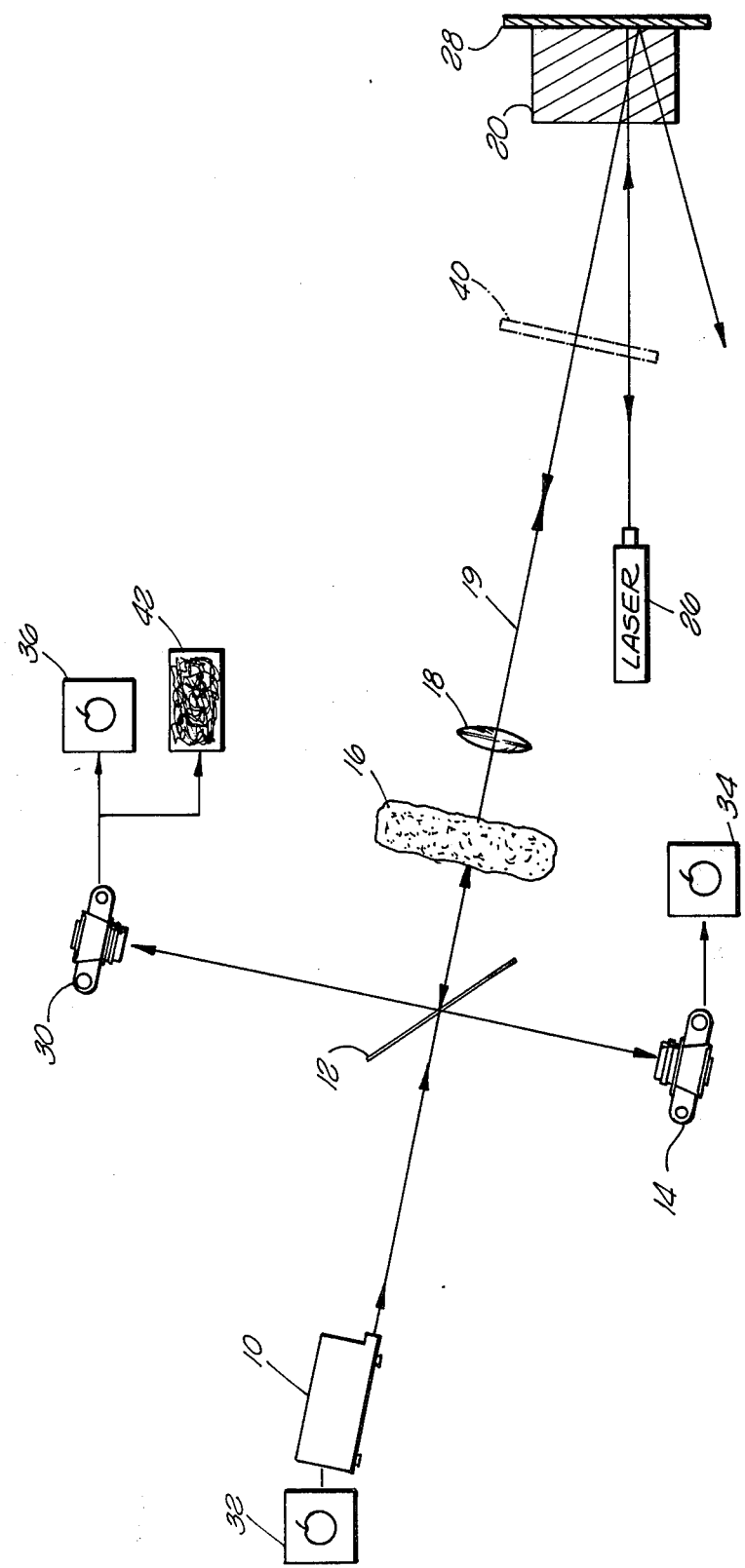
FIG. 1 is an apparatus for generation of a time-reversed replica of a wave front by non-linear refraction according to the present invention.

Referring to FIG. 1, a monochromatic light source 10, which could be a laser, is positioned so a that light beam projected therefrom will strike a beam splitter 12 which transmits a part of the light and reflects a part of the light to an appropriately positioned light source camera 14. A phase-distorting medium 16 is positioned in the path of the light transmitted through the beam splitter 12. The phase-distorting medium could be any light-scattering, preferably low-absorbing medium and is exemplified herein by clouded glass such as that commonly utilized for shower doors. Other examples of light scattering mediums include optical fibers, jet engine exhausts and light amplifiers. A focusing lens 18 focuses light radiating from the phase-distorting medium 16 onto a homogeneous, substantially transparent, non-linear medium which in this specific embodiment is liquid carbon disulfide. The thus focused light is referred to as the probe beam 19. A second monochromatic light source 26, referred to as a pump laser (i.e., its beam is activating) is directed so that its output beam irradiates the non-linear medium 20 at a location such that it intersects the probe beam 19. It is important that the pump laser output beam is counter-propagated within the non-linear medium 20. The counter-propagating effect in this embodiment is obtained by a mirror 28 positioned so that light from the pump laser 26 is reflected back into the pump laser 26. Although in this embodiment the mirror 28 is shown immediately adjacent the non-linear medium 20, it could just as well be spaced therefrom. As the probe beam 19 intersects the counter-propagating pump laser beam within the non-linear medium 20, a third order non-linear susceptibility causes a time-reversed replica of the probe beam 19 to be formed. A significant portion of the probe beam 19 is reflected back along its originally propagated path, through the focusing lens 18, the phase-distorting medium 16 and from the beam splitter 12 into an image-recording camera 30. According to the principles of the present invention, it is important that the counter-propagating waves within the non-linear medium 20 be of substantially the same frequency.

Figure 2:
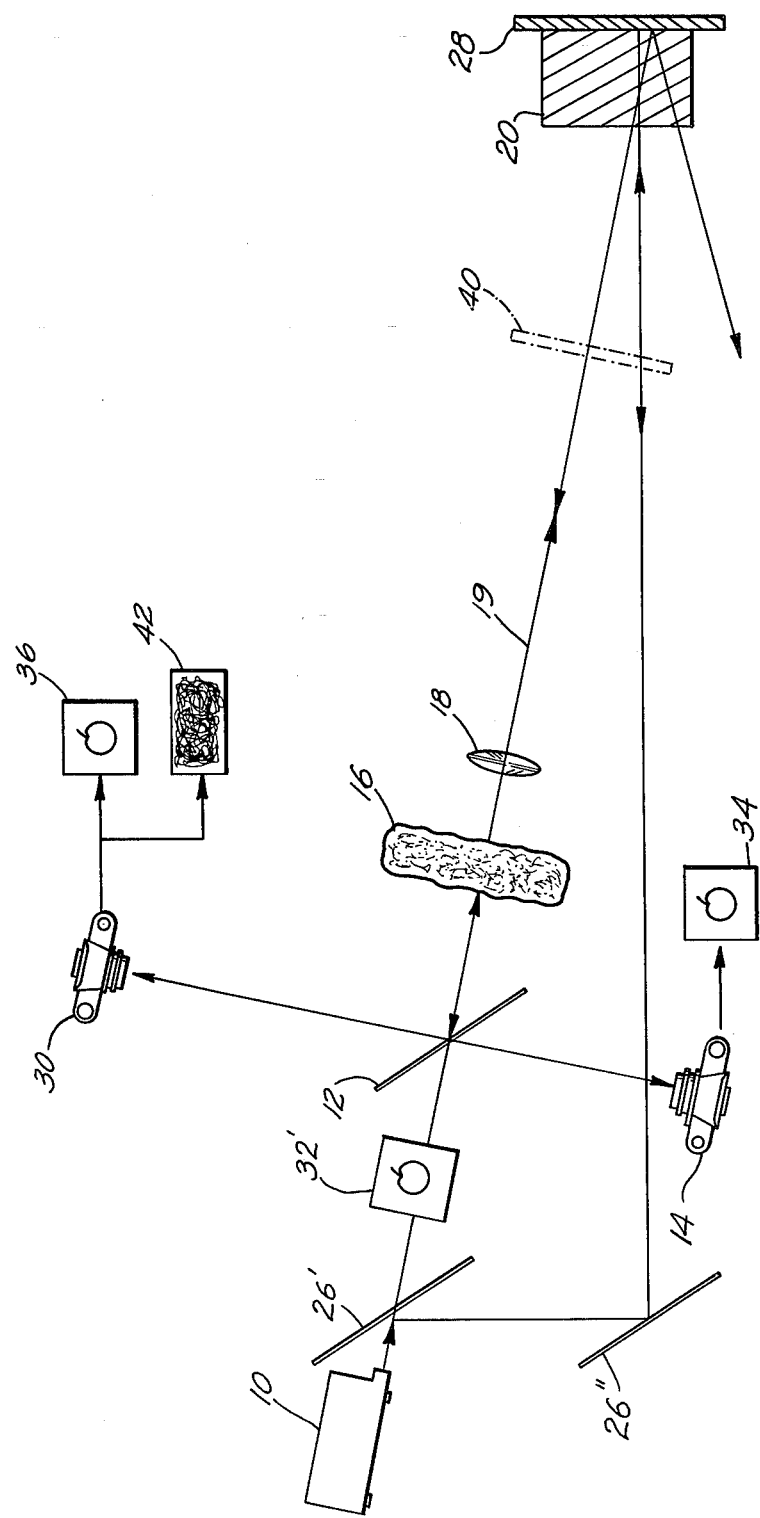
FIG. 2 is an alternative apparatus showing the use of a beam splitter in place of one of the laser components.

Alternatively, a single monochromatic light source in conjunction with a beam splitter could be used in lieu of the monochromatic light source 10 and pump laser 26, light reflected from the beam splitter constituting a light source beam and light transmitted through the beam splitter constituting a pump laser beam. Such an arrangement is shown in FIG. 2 in which a pair of beam splitters 26' and 26" intercepts light from the laser source 10 to direct a portion of that light to irradiate the non-linear medium 20 such that it intersects the probe beam 19, in the manner described above with respect to the output of monochromatic light source 26 of that figure. Of course, in this embodiment the apple image 32' is placed forward of the beam splitter 26', but rearwardly of the beam splitter 12. Operation in all other respects is identical to that with respect to the apparatus of FIG. 1.

Although the radiation in this embodiment is a monochromatic light source, any monochromatic (i.e., narrow frequency range) wave (e.g., acoustic, electromagnetic, plasma) could be utilized provided a similar type monochromatic wave is counter-propagated through a non-linear medium.

In operation, the monochromatic light source 10 propagates an image which for illustrative purposes is shown at 32 as an apple. The image intersects the beam splitter 12, a reflected portion being recorded by the light source camera 14 as shown at 34. This image 34 is a record of the image shown at 32. The portion of the light source 10 output passing through the beam splitter 12 irradiates a phase distorting medium 16 which reorders the various wave fronts forming the image shown at 32 and radiates light with wave fronts unrecognizable as such an image. This radiated beam is focused by the focusing lens 18 and is directed in the form of a probe beam 19 into the non-linear medium 20. The pump laser 26 radiates the non-linear medium 20, the light passing therethrough being reflected by the mirror 18 thereby providing counter-propagating waves within the non-linear medium 20 having substantially the same frequency. The probe beam 19 intersects the counter-propagating waves within the non-linear medium 20 and a portion thereof is reflected back along the original path of the probe beam 19, into the focusing lens, and onto the phase distorting medium 16. Light emerging from the phase-distorting medium is reflected by the beam splitter 12 to the image-recording camera 30, the light forming an image as shown at 36. Thus one can appreciate that with the apparatus above described, the original image shown at 34, after having passed through a wave distorting medium 16, can be converted into a time-reversed replica of which, when again passing through the phase distorting medium 16, is converted into an ordered wave front corresponding to the original image 34 as shown at 36. Without the non-linear medium 20 and the counter-propagating pump-laser wave fronts, such a replication of the original image would not occur. Illustrative of this point, a reflecting mirror 40 (shown in phantom) positioned in the path of the probe beam 19 would cause formation of an image at the recording camera 30 which would be unrecognizable with respect to the original image shown at 32 as shown at 42.

In a specific application of the above embodiment, a ruby laser at a wave length of 6943 angstroms was utilized to create the counter-propagating waves within a carbon disulfide non-linear medium 20. It was found that a probe beam 19 power of approximately 4% of the pump laser output power produced execellent results. The output of the monochromatic light source 10 need not have any particular wavelength relationship to the output of the pump laser 26. However, if the light source has a frequency of $W_1$ and the probe beam has a frequency of $W_2$, then the time-reversed replica will have a frequency if $2W_1 - W_2$.

The apparatus of the present invention could be utilized in conjunction with an optical quantum amplifier for increasing the brightness of lasers. A conventional optical quantum amplifier usually induces a directivity deterioration of an incoming laser beam due to static or dynamic inhomogeneities in the refractive index of its amplifying medium. Using the apparatus of the present invention, high directivity of the amplified laser beam can be obtained when optical quality of the quantum amplifier is low by substituting the quantum amplifier for light-scattering medium of the above described embodiment. The output of the quantum amplifier, after being reflected back from the non-linear medium, will pass through the quantum amplifier and emerge with the same wave front as the entering laser beam to be amplified. This emerging radiation can then be isolated by a beam splitter according to the above described embodiment, thereby providing an amplified laser beam having the same directivity as the incoming laser beam.

I claim:

1. An apparatus for replication of an optical image that has passed through a light-scattering medium comprising:
    means for generating a substantially monochromatic incident light beam and a pump laser beam;
    a homogeneous non-linear medium substantially transparent to said incident light beam;
    means for counter-propagating said pump laser beam through said non-linear medium;
    means for directing said incident light beam along a predetermined path into said non-linear medium after having passed through said light-scattering medium whereby to reflect back at least a portion of said incident light beam along a path colinear with said predetermined path, said reflected light being a time-reversed wave front; and means for isolating said reflected light after said reflected light is passed through said directing means and said light-scattering medium.

2. The apparatus of claim 1 in which said pump laser beam and said incident light beam are separately generated.

3. The apparatus of claim 1 in which said incident light beam is formed by a laser.

4. The apparatus of claim 3 in which said pump laser beam is obtained by beam-splitting of said incident light beam.

5. The apparatus of claim 1 in which said non-linear medium is liquid carbon disulfide.

6. The apparatus of claim 5 in which said pump laser beam has a wavelength of 6493 Å.

7. The apparatus of claim 5 in which said counter-propagating means comprises a mirror, said mirror being positioned so that its reflecting surface is normal to said pump laser beam path after having passed through said non-linear medium, thereby creating forward and backward pump laser beams of substantially the same amplitude.

8. The apparatus of claim 1 in which said directing means is a focusing lens.

9. The apparatus of claim 1 in which said isolating means is a beam splitter positioned between said incident light beam generating means and said light-scattering medium.

10. In an apparatus for replication of an optical image that has passed through a light-scattering medium, said apparatus having a monochromatic light source, means for reflecting said light source output having passed through said medium back through said medium, and a means for isolating said reflected light source output after having passed through said medium, the improvement according to which said reflecting means comprises:

means for generating a pump laser beam;
a homogeneous, transparent non-linear medium;
means for directing said pump laser beam into said non-linear medium;
means for counter-propagating said pump laser beam back through said non-linear medium, thereby creating forward and backward propagating pump laser beams having substantially the same amplitude.

11. A method for generating a time-reversed replica of an image-bearing wave having a narrow wave frequency comprising:

generating a pump wave;
counter-propagating said pump wave through a homogeneous non-linear medium substantially transparent to said image-bearing wave whereby the resultant counter-propagating wave is at substantially the same frequency; and
directing said image-bearing wave into said non-linear medium intersecting said counter-propagating wave and generating thereby a time-reversed replica of said image-bearing wave.

12. The method of claim 11 in which said image-bearing wave and said counter-propagating waves are electromagnetic waves.

13. A method for replication of an optical image that has passed through a light-scattering medium comprising the steps of:

generating a substantially monochromatic incident light beam and a pump laser beam;
counter-propagating said pump laser beam through a homogeneous non-linear medium substantially transparent to said incident light beam;
directing said incident light beam along a predetermined path into said non-linear medium after having passed through said light-scattering medium whereby to reflect back at least a portion of said incident light beam along a path colinear with said predetermined path, said reflected light having a time-reversed wave front; and
isolating said reflected light after said reflected light has passed through said light-scattering medium.

14. The method of claim 13 in which said pump laser beam and said incident light beam are separately generated.

15. The method of claim 13 in which said pump laser beam is obtained by beam splitting of said indicent light beam.

16. An apparatus for replication of a wave having a narrow wave frequency that has passed through a wave-scattering medium comprising:

means for generating an incident wave of said narrow frequency and a pump wave;
a homogeneous non-linear medium substantially transparent to said incident wave;
means for counter-propagating said pump wave through said non-linear medium;
means for directing said incident wave along a predetermined path into said non-linear medium after having passed through said wave-scattering medium whereby to reflect back at least a portion of said incident wave along a path colinear with said predetermined path, said reflected wave being a time-reversed replica of the incident wave; and
means for isolating said reflected wave after said reflected wave is passed through said directing means and said wave-scattering medium.

17. In an apparatus for replication of an incident wave having a narrow wave frequency that has passed through a wave-scattering medium, said apparatus having a generating source of said narrow wave frequency, means for reflecting said incident wave having passed through said medium back through said medium, and a means for isolating said reflected wave after having passed through said medium, the improvement according to which said reflecting means comprises:

means for generating a pump wave;
a homogeneous, non-linear medium transparent to said waves;
means for directing said pump wave into said non-linear medium;
means for counter-propagating said pump wave back through said non-linear medium, thereby creating forward and backward propagating pump waves having substantially the same amplitude.

18. A method for replication of a wave having a narrow wave frequency that has passed through a wave-scattering medium comprising the steps of:

generating an incident wave of said narrow frequency and a pump wave;
counter-propagating said pump wave through a homogenous non-linear medium substantially transparent to said incident wave;

directing said incident wave along a predetermined path into said non-linear medium after having passed through said wave-scattering medium whereby to reflect back at least a portion of said incident wave along a path colinear with said predetermined path, said reflected wave being a time-reversed replica of the incident wave; and isolating said reflected wave after said reflected wave has passed through said wave scattering medium.

19. The method of claim 18 in which said pump wave and said incident wave are separately generated.

20. The method of claim 18 in which said pump wave is obtained by beam splitting of said incident wave.

21. The method of claim 18 in which said waves are electromagnetic waves.

* * * * *

UNITED STATES PATENT AND TRADEMARK OFFICE
CERTIFICATE OF CORRECTION

PATENT NO. : 4,145,671
DATED : March 20, 1979
INVENTOR(S) : Robert W. Hellwarth

It is certified that error appears in the above-identified patent and that said Letters Patent are hereby corrected as shown below:

Column 1, line 45, delete "that" and substitute therefor --than--.

Column 5, line 20, delete "6493" and substitute therefor --6943--.

Signed and Sealed this

Eleventh Day of September 1979

[SEAL]

Attest:

Attesting Officer

LUTRELLE F. PARKER
Acting Commissioner of Patents and Trademarks